United States Patent [19]

Neumann

[11] Patent Number: 5,861,947
[45] Date of Patent: Jan. 19, 1999

[54] MEASURING DEVICE FOR MEASURING CONCENTRATED RADIATION OF LIGHT

[75] Inventor: Andreas Neumann, Swisttal, Germany

[73] Assignee: Deutshes Zentrum für Luft-und Raumfahrt e.V., Bonn, Germany

[21] Appl. No.: 28,503

[22] Filed: Feb. 24, 1998

[30] Foreign Application Priority Data

Feb. 25, 1997 [DE] Germany .................. 197 07 461.8

[51] Int. Cl.⁶ .................. G01J 1/56; F24J 2/38
[52] U.S. Cl. .................. 356/216; 250/203.4; 126/578
[58] Field of Search .................. 356/121, 236, 356/215, 218, 226, 222, 216; 250/203.4, 203.1, 203.3; 126/573, 576, 578, 688, 683; 136/246

[56] References Cited

U.S. PATENT DOCUMENTS

| | | |
|---|---|---|
| 4,013,885 | 3/1977 | Blitz . |
| 4,015,116 | 3/1977 | Bahm .................. 356/215 |
| 4,276,872 | 7/1981 | Blake et al. .................. 250/203.4 |
| 4,430,000 | 2/1984 | Eldering et al. .................. 356/236 |
| 4,440,150 | 4/1984 | Kaehler .................. 250/203.4 |
| 4,519,382 | 5/1985 | Gerwin .................. 250/203.4 |
| 5,616,913 | 4/1997 | Litterst .................. 250/203.4 |

OTHER PUBLICATIONS

Solar Energy Materials—"Dish–Stirling test facility", Kleith,J.—1991 vol. 24, pp. 231–237.
Applied Solar Energy—"Television Method for Measuring Light Flux Intensity in the Focal Zone for Solar Concentrator", Konyshev, et al. 1993, vol. 29, No. 3, 60–63 Hermes II, A Neumann; 1993.

*Primary Examiner*—Hoa Q. Pham
*Attorney, Agent, or Firm*—Diller, Ramik & Wight, PC

[57] ABSTRACT

Measuring device (1) for measuring concentrated radiation of light with a reflector (3) arranged in an inclined manner being transversely movable through the incident light (4). A camera (2) recording the light reflected by the reflector (3) has its optical axis (2a) aligned approximately parallel to the direction of movement of the reflector (3). This allows for a flat arrangement of the measuring device (1).

5 Claims, 2 Drawing Sheets

MEASURING DEVICE FOR MEASURING CONCENTRATED RADIATION OF LIGHT

BACKGROUND OF THE INVENTION

The invention relates to a measuring device for measuring concentrated solar radiation, for example in a solar power plant.

BACKGROUND OF THE INVENTION

In applications in which solar radiation is focused on a point or an area, measurements in the focus are necessary to obtain information about the flux density of the concentrated radiation and therefore about the maximum temperature which can be obtained. Such an application is, for example, a solar power plant. In such an installation, solar radiation is focused by a plurality of reflecting heliostats onto a receiver. The receiver is arranged on a high tower such as to be able to receive the reflected solar radiation of all the heliostats. The aperture of the receiver can have a size of up to several square meters.

The heliostats have to be moved according the course of the sun so that the solar radiation reflected by the heliostats is always focused on the receiver. U.S. Pat. No. 4,013,885 describes a way of tracking the sun by means of a heliostat. The heliostat comprises a lens arranged in the rotational axis thereof through which both directly incident solar radiation and infrared radiation directly emitted from the heated receiver can travel behind the reflector surface of the heliostat. This portion of the solar radiation is redirected by means of mirrors until it travels paraxial to the infrared radiation. In the optical path of the infrared radiation and the solar radiation, a four quadrant detector is arranged able to detect both solar and infrared radiation. If the infrared and the solar radiation detected by the detector travel along divergent paths, this means that the heliostat is not focused properly, whereupon it is moved according to the course of the sun until the infrared radiation and the solar radiation are aligned again.

The flux density of the concentrated solar radiation in the focal zone can be measured by means of calorimeters or radiometers. This is a time-consuming process, however, as the calorimeters have to move across the area of the focal zone and have to be stopped each time the radiation is to be measured. This way, scanning an area of some square meters requires at least a few minutes. Therefore, transient measurements, as in the case of passing clouds, are not possible with this measuring system.

Another possibility is to scan the area to be measured by means of a video camera. For this purpose, a white, diffuse reflector screen is moved into the focus. A video camera records the intensity of the reflected radiation. In a calibration, the distribution of the incipient light can be entered in $W/m^2$. Arrangements of this kind are described, for example, in the articles "Dish-Stirling test facility", Kleith, J., Solar Energy Materials 1991, Vol. 24, pp. 231–237, and "Television Method for Measuring Light Flux Intensity in the Focal Zone for Solar Concentrator", Konyshev, A. N., i. a., Applied Solar Energy 1993, Vol. 29, No. 3, pp. 60–63. In the focal zone, the flux density reaches values of up to more than 10 $MW/m^2$. This leads to temperatures of over 1000° C. Therefore, the reflector screen can only remain in the focal zone for a short time without the need to be cooled heavily. The reflector can be moved or pivoted into the radiation flux as a large plate. However, as large areas of several square meters have to be measured in the case of some applications, such a plate would be very large. In such a case, the reflector could not be moved rapidly and would therefore be exposed to the concentrated radiation flux for too long a period. Moreover, the receiver would be completely covered at the time of measurement, so that no radiation is fed into the receiver, which would cause an undesired load alternation in a power plant connected to the receiver.

These drawbacks can be avoided by using a beam-shaped reflector which is moved through the optical path instead of a plate-shaped reflector. As the mass of the beam is smaller, the moving speed can be increased and the dwell period in the radiation flux reduced. The video camera then records a series of snapshots of the moving reflector rather than a single image. Then the sections of the images showing the reflector are extracted from the individual images using an image processing system and are put together to form a radiation flux image.

The camera has to be able to take in a measuring surface of a size of up to several square meters. That is why it has to be positioned at a certain distance from the focus. This minimum distance amounts to about 10 m in the case of large focal zones. If the camera were to be arranged on a tower of a solar tower plant, considerable difficulties would have to be overcome, with such towers having a height of up to 140 m. A arm for the camera would have to be mounted on the tower. This arm, however, would be exposed to considerable winds, which would lead to an inaccurate alignment of the camera. Furthermore, the camera would have to be encapsulated in a weatherproof manner. Both this fact and the badly accessible position of the camera cause problems of maintenance of the measuring means. For these reasons, the camera is positioned on the ground in present applications, which leads to a camera distance of up to 150 m (see, e.g., "HERMES II, ein Heliostat- und Receiver-Messsystem, Neumann, A; Solares Testzentrum Almeria, Berichte der Abschlusspräsentation des Projektes SOTA"; Verlag C. F. Müller, Karlsruhe; 1993).

For a geometrically accurate image processing, control points have to be recorded. These control points are geometrically measured points on the receiver or in a different comparable position. In such a case, the alignment of the camera must not be changed during all the measuring operations to follow. If a mistake occurs in recording the control points, all the data obtained in the measuring operations to follow are of little practical value or no value at all.

As the video camera only provides relative shades of gray, the system has to be calibrated. In this process, the gray scale values are associated with radiation fluxes in the plane of the focal zone expressed in a unit of $W/m^2$. Especially in the case of optical systems mounted on the camera, such as is the case, for example, with teleobjectives required at these distances, lens faults and reduced transmission lead to problems of calibration.

Because of the large distance of the camera from the receiver, the reflector beam cannot be arbitrarily narrow, since the camera would not be able to resolve the section of the image containing the beam in a satisfactory manner. If the focal zone is behind glass panes or filters, the camera is usually unable to photograph the reflector, as reflections occur on the glass pane or the spectrum is changed by a filter.

SUMMARY OF THE INVENTION

It is the object of the invention to provide a small-sized measuring device so that the camera can be arranged near the focus of the concentrated radiation of light.

The measuring device according to the invention comprises a strip-shaped reflector which is inclined relatively to the main incidence direction of the radiation cone of the concentrated radiation of light and is moved transversely to the direction of the incident light. The optical axis of the camera is arranged at an angle of a maximum of 20°, preferably a maximum of 10° or 5°, and especially 0°, to the direction of movement of the reflector. The reflector is inclined such that the reflected light can be received by the camera. As the camera can record the reflector without any substantial traveling area, it is possible to arrange the camera near the reflector so that the camera only has to have a small coverage. The camera only has to comprise a depth of field sufficient to image the reflector in any position. The result is a small-sized, even planar arrangement of the measuring device. Therefore, the entire measuring device including the reflector and the camera can be arranged in front of the receiver like a disk and can be integrated in the tower. This direct arrangement dispenses with the need to use teleobjectives or to provide camera arms of a complicated construction on the tower. The image of the reflector fills the coverage area of the camera, wholly or substantially, allowing a heat detection in a highly efficient manner.

Preferably, the camera is mounted on a support device moving the reflector through the incident light. In this manner, the distance of the camera from the measuring area is determined so that the camera only has to be adjusted once during the assembly of the measuring device and does not have to be aligned by means of control points before each new measuring process.

In a preferred embodiment of the invention, the camera is a line camera. As opposed to a frame camera, a line camera only records a single line of pixels. The line camera is aligned such as to image the reflector in any position. It is possible to use a line camera, as the reflector, when moving through the incident light, only changes its distance from the camera, with its alignment towards the camera otherwise remaining the same. The expenditure in image processing is considerably reduced, as only the individual lines have to be combined to form an image, instead of individual sections of the fully recorded images having to be taken out of the images and recombined.

The reflector can consist of a transparent diffusor arranged transversely to the main incidence direction of the radiation cone and a mirror arranged in the direction of the radiation flux behind the diffusor. The mirror is mounted on an edge of the diffusor in an angle of 45°, the opening side of the angle being directed towards the camera. This reflector arrangement has the advantage to increase the opening angle by which incident radiation is captured. Thus, even radiation components of those heliostats which are arranged in an angle of up to about 90° relative to the main incidence direction of the incident light, can be determined for each measuring point.

BRIEF DESCRIPTION OF THE DRAWINGS

Embodiments of the invention will now be described with reference to the accompanying drawings.

DESCRIPTION OF THE PREFERRED EMBODIMENTS

Figure 1:
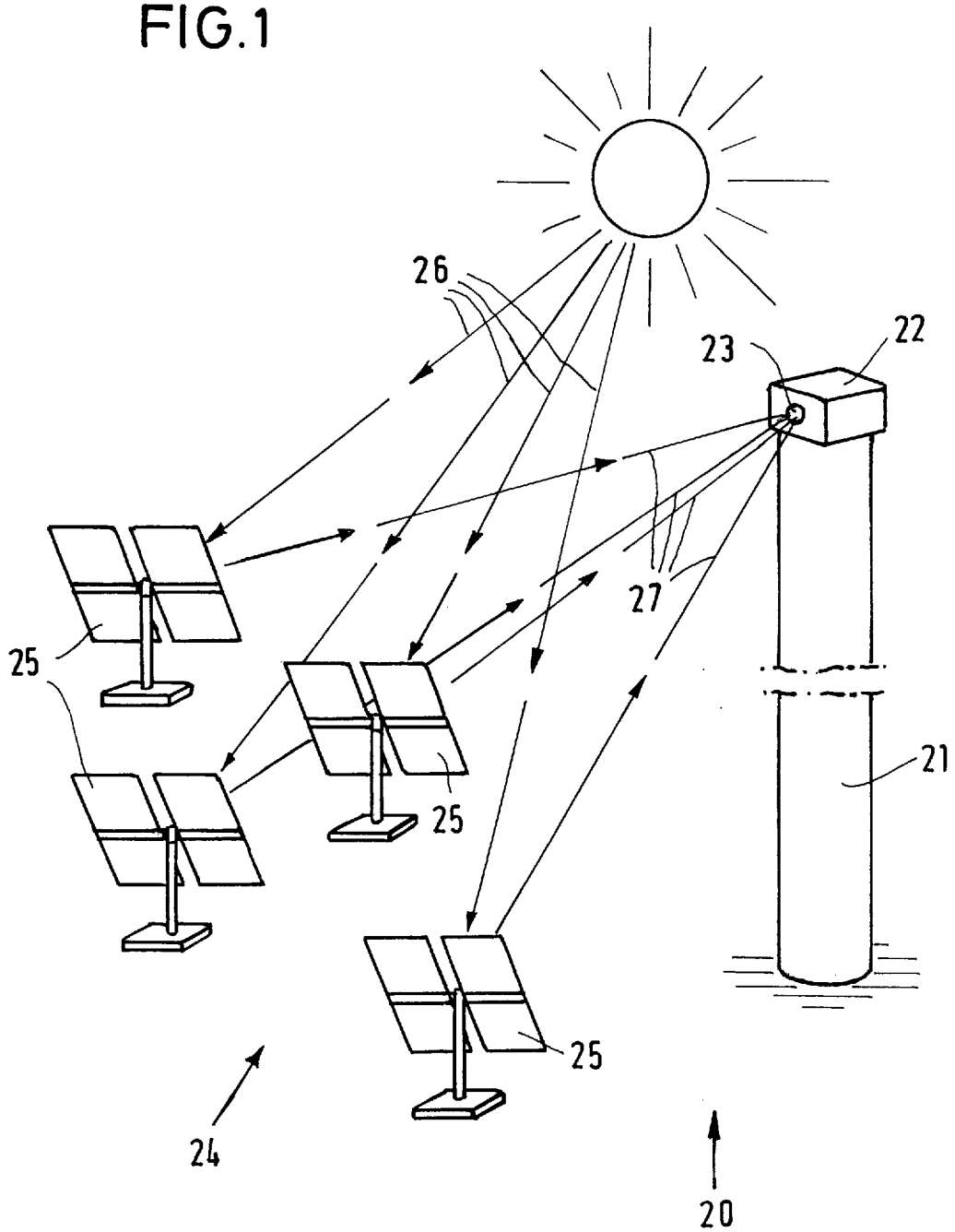
FIG. 1 shows a schematic representation of a solar tower plant.

FIG. 1 shows a solar tower plant 20. On a tower 21 with a height of about 140 m, a cover 22 is arranged containing a receiver or absorber to which sunlight is directed. This receiver serves as a converter for emitting the received radiation energy in the form of heat to a heat transfer medium. On the frontal face, the cover 22 comprises an input opening 23 the size of which roughly corresponds to that of the aperture of the receiver. The tower 21 is surrounded by a field of heliostats 24. The field of heliostats 24 consists of a plurality of individual heliostats 25 positioned on the ground and being arranged in the area of the frontal face of the tower. Heliostats 25 are mirrors reflecting the incident sunlight 26 in a directed manner. The sunlight 27 reflected by the heliostats 25 is focused onto the input opening 23. The heliostats 25 are arranged rotatably such as to be able to be moved according to the course of the sun.

Figure 2:
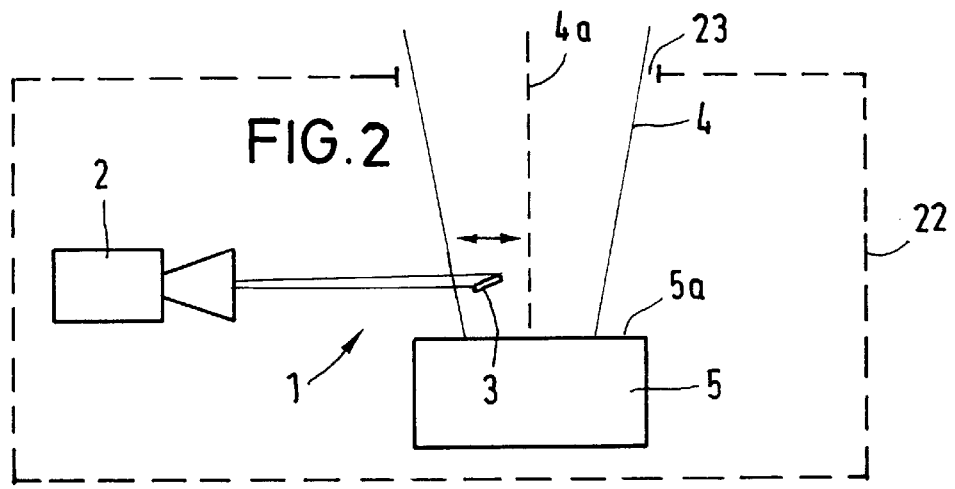
FIG. 2 shows a top plan view of the measuring device.

FIG. 2 shows the measuring device 1 arranged in the cover 22 in front of the receiver 5. The measuring device 1 comprises a camera 2 and a reflector 3. The reflector 3 is arranged movably so that it can be moved transversely through the radiation cone 4 of the incident light. The radiation cone 4 is comprised of individual radiation components 27 reflected by the heliostats 25. The heliostats 25 are aligned such that the focal zone of the radiation cone 4 is directed towards the receiver 5.

The main incidence direction 4a of the light runs transversely to the frontal face 5a of the receiver 5. The reflector 3 has the shape of a narrow strip extending across the entire height of the frontal face 5a and being far narrower than the frontal face. It serves to select the distribution of the strength of the radiation in front of the receiver by rows and is movable in the horizontal direction for this purpose. The reflector 3 is inclined relatively to the main incidence direction 4a so that the sunlight impinging on the reflector 3 is reflected and the camera 2 can record the reflection. The reflector 3 is movable parallel to the receiver surface 5a through the radiation cone 4. In this process, the inclination of the reflector remains unchanged. The angle of the optical axis 2a of the camera 2 relative to the frontal face 5a of the receiver 5 amounts to 0°. The angle of the reflector to the main incidence direction 4a amounts to about 70°–80° when the camera is directed transversely to the main incidence direction 4a, i. e. parallel to the receiving surface 5a, as is shown in the Figure. In order to ensure a Lambert reflection of the reflector 3, it is covered with white aluminum oxide.

Figure 3:
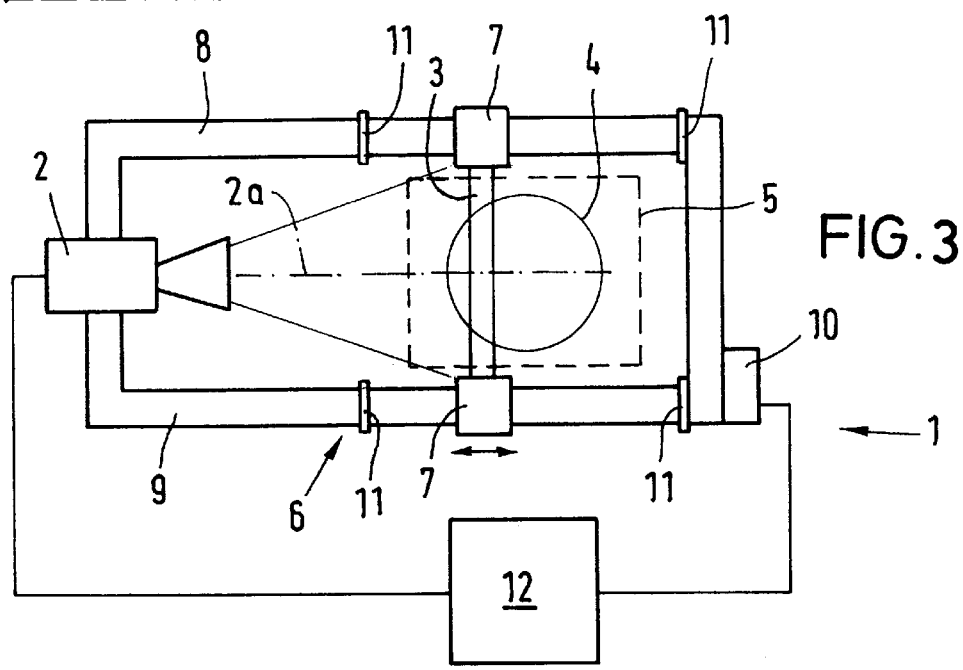
FIG. 3 shows a front view of the measuring device.

FIG. 3 shows the entire measuring device 1. The reflector 3 and the camera 2 are mounted on a supporting frame 6. On the two ends of the reflector 3, reception members 7 are arranged lying on longitudinal supports 8 and 9 of the supporting frame 6 and forming a sled being movable along the longitudinal supports 8, 9 by a driving system (not represented) such as a spindle. A stepping motor 10 drives the driving system with the reflector 3 being movable in a linear direction in a range of measurement limited by stoppers 11. The range of measurement limited by the stoppers 11 is slightly larger than the aperture of the receiver 5. The camera 2 is mounted on the longitudinal end of the supporting frame 6 opposite the stepping motor 11. A line camera 2 is used which is adjusted to the reflector 3 a single time and is mounted afterwards. A computer 12 controls the coordination between the stepping motor 10 and the line camera 2. Furthermore, the computer receives the single images produced by the line camera 2 and joins them to a flux density map.

When the measuring device is operated, the reflector 3 is continuously moved through the radiation cone 4. Each time the reflector 3 was moved by one width of the beam, the computer activates the line camera 2 so that it records the sunlight reflected by the reflector 3 and outputs the partial image to the computer. When the movement through the range of measurement has been completed, the single row-shaped partial images are joined to form a complete image. This image then provides information about the distribution of the flux density in the radiation cone 4 at the receiver 5.

Figure 4:
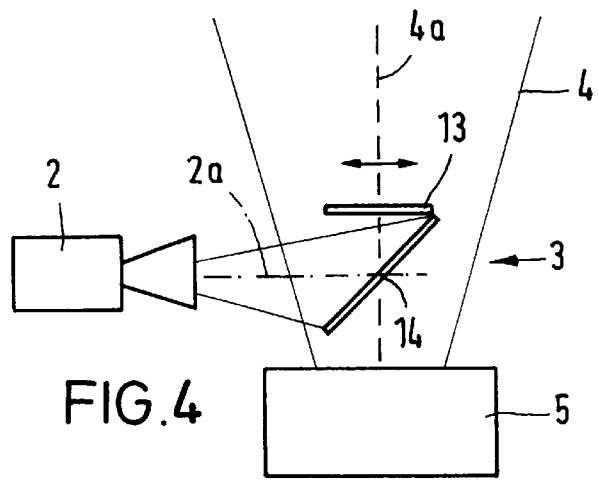
FIG. 4 shows a top plan view of another embodiment of the invention.

Another embodiment of the invention is represented in FIG. 4. The reflector 3 consists of a transparent diffusor 13 being arranged transversely to the main incidence direction 4*a* of the radiation cone 4 and of a mirror 14 being mounted on an edge of the diffusor 13 in an angle of 45°. The opening side of the angle is directed towards the camera 2 so that the incident radiation travels through the diffusor 13 to the mirror and is mirrored from there to the objective of the camera. By means of this embodiment of the reflector 3, even radiation components 27 with larger angles of incidence can be measured.

What is claimed is:

1. Measuring device for measuring concentrated radiation of light, comprising a reflector (3) in the shape of a strip movable transversely through the incident light (4) and a camera (2) observing the reflector (3), wherein the reflector (3) is arranged in an inclined manner relative to the main incidence direction (4*a*) of the light (4) and wherein the optical axis (2*a*) of the camera (2) is aligned approximately parallel to the direction of movement of the reflector (3).

2. Measuring device according to claim 1, wherein the camera (2) is mounted on a rigid supporting frame (6) on which the reflector (3) is guided.

3. Measuring device according to claim 1, wherein the camera (2) is a line camera.

4. Measuring device according to claim 1, wherein the reflector (3) is inclined by 70°–80° relative to the main incidence direction (4*a*) of the incident light (4).

5. Measuring device according to claim 1, wherein the reflector (3) consists of a diffusely transparent strip arranged transversely to the main incidence direction (4*a*) of the light (4) with a mirror (14) arranged behind it at an angle of 45°.

\* \* \* \* \*